72784

*Wm Bisbee and Fleming G Hean's "Gate Door Hasps and Hooks"*

PATENTED
DEC 31 1867

Witnesses.
Theo Tusche
N. Truvin

Inventor.
Wm Bisbee
F. G. Hean
Per Munn &co
Attorneys

United States Patent Office.

WILLIAM BISBEE AND FLEMING G. HEARN, OF YREKA, CALIFORNIA.

Letters Patent No. 72,784, dated December 31, 1867.

IMPROVEMENT IN ADJUSTABLE HASPS AND HOOKS FOR DOORS.

The Schedule referred to in these Letters Patent and making part of the same.

TO ALL WHOM IT MAY CONCERN:

Be it known that we, WILLIAM BISBEE and FLEMING G. HEARN, of Yreka, Siskiyou county, California, have invented a new and useful Improvement in Hasps and Hooks for Gates and Doors; and we do hereby declare that the following is a full, clear, and exact description thereof, which will enable others skilled in the art to make and use the same, reference being had to the accompanying drawings, forming a part of this specification.

This invention relates to an improvement in hasps and hooks for gates and doors, intended to meet the shrinkage of timber which takes place during long-continued dry weather, and the swelling consequent on continued rains. It consists in connecting either the hook or the hasp by a spring in the shank of the hook. In the accompanying drawings—

Similar letters of reference indicate corresponding parts.

Figure 1:
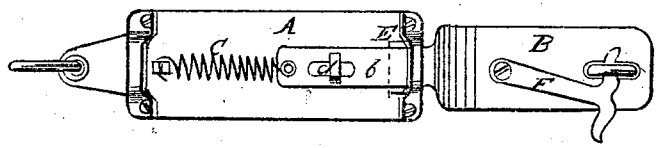
Figure 1 is a top view of a box-hasp, with the top of the box removed.
Figure 2:
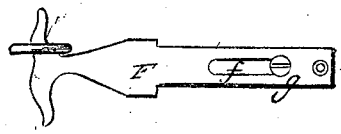
Figure 2 is a top view of a hook attached by a set-screw passing through a slot.
Figure 3:
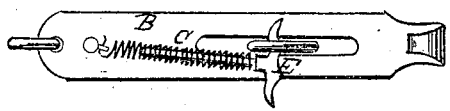
Figure 3 is a top view of hasp, with a hook attached by a spiral, figs. 2 and 3 representing alternative arrangements of our improvement, as shown in fig. 1.

A is the bottom plate of the box-hasp. B the hasp, held, in the case shown in fig. 1, to the main plate by the spiral spring C, attached to said main plate A, and to the shank $b$ of the hasp, and by the bolt D passing through the slot in the said shank $b$. The bolt D is provided with a shoulder, on which the hasp sits, and the said shoulder, together with a rest, E, at the front end of the box, and of the same height as said shoulder, keeps the hasp B off the bottom plate A, thereby diminishing friction and wear and tear of the parts. The box-hasp B may be a joint-hasp, and may be used against a corner as well as upon a flat surface. The hook F, in the case shown in fig. 1, is pivoted to the hasp. In that shown in fig. 2, the hook F is attached, by the spiral spring C, to a pin on the hasp B; and in the case shown in fig. 3, the hook is adjustable by the set-screw $g$ passing through the slot $f$.

By the use of any of these alternative forms, the shrinkage or swelling before mentioned is compensated for; and while the cost of our improvement very slightly exceeds that of the ordinary hooks and hasps of similar description, our hooks and hasps are far more durable.

We claim as new, and desire to secure by Letters Patent—

1. The spring C, in combination with the box-hasp B, for self-adjustment in contraction and expansion of doors, &c., substantially as above set forth and described 2. The said spring C, in combination with the adjustable hook F and hasp B, substantially as and for the purpose above set forth and described.

WILLIAM BISBEE,
FLEMING G. HEARN.

Witnesses:
L. W. KETCHAM,
R. S. GREEN.